(12) United States Patent
Eriksson

(10) Patent No.: US 6,398,913 B2
(45) Date of Patent: Jun. 4, 2002

(54) ARRANGEMENT AND METHOD FOR RECOVERY OF ENERGY IN A PAPER MACHINE FORMING SECTION

(75) Inventor: Sören Eriksson, Charlotte, NC (US)

(73) Assignee: Metso Paper Karlstad Aktiebolag, Karlstad (SE)

(*) Notice: Subject to any disclaimer, the term of this patent is extended or adjusted under 35 U.S.C. 154(b) by 0 days.

(21) Appl. No.: 09/738,515

(22) Filed: Dec. 15, 2000

Related U.S. Application Data
(60) Provisional application No. 60/230,945, filed on Sep. 6, 2000.

(30) Foreign Application Priority Data

Dec. 16, 1999 (SE) ............................................. 9904602

(51) Int. Cl.[7] .................................................. D21F 1/66
(52) U.S. Cl. ......................... 162/190; 162/264; 290/54; 415/2.1; 415/3.1
(58) Field of Search ................................ 162/190, 202, 162/264; 290/54, 43; 415/2.1, 3.1

(56) References Cited

U.S. PATENT DOCUMENTS

| | | | | |
|---|---|---|---|---|
| 4,306,157 A | * | 12/1981 | Wracsaricht | ................. 290/54 |
| 6,013,955 A | * | 1/2000 | Dos Santos Costa | ......... 290/54 |

* cited by examiner

Primary Examiner—Dean T. Nguyen
(74) Attorney, Agent, or Firm—Alston & Bird LLP

(57) ABSTRACT

The invention relates to a method of recovering energy in a forming section of a papermaking or boardmaking machine, wherein stock from a headbox is fed into a forming zone of a forming section, said forming zone including at least one looped forming fabric curving along a convex surface of a support member, and water is drained from the stock through said at least one forming fabric in the forming zone to form a paper or board web, the water passing through said at least one fabric being thrown out from the forming zone and possessing kinetic energy, characterized by placing a movable component in the water thrown out from the forming zone, so as to cause the water to move the component, and thereby recovering part of the kinetic energy. The invention also relates to an arrangement in a papermaking or boardmaking machine.

36 Claims, 14 Drawing Sheets

ARRANGEMENT AND METHOD FOR RECOVERY OF ENERGY IN A PAPER MACHINE FORMING SECTION

CROSS-REFERENCE TO RELATED APPLICATION

The present application claims the benefit of the filing date of U.S. Provisional Patent Application No. 60/230,945, filed Sep. 6, 2000.

FIELD OF THE INVENTION

This invention relates to a method of recovering energy in a forming section of a papermaking or boardmaking machine, wherein stock from a headbox is fed into a forming zone of a forming section, the forming zone including at least one looped forming fabric curving along a convex surface of a support member, and water is drained from the stock through the forming fabric in the forming zone to form a paper or board web, the water passing through the fabric and being thrown out from the forming zone with a substantial velocity. Moreover, the invention relates to an apparatus for forming a web in a papermaking or boardmaking machine.

BACKGROUND OF THE INVENTION

Paper and board is today produced at very high speeds, and especially tissue paper, newsprint, and magazine paper. For tissue the machine speed has today reached 2000 m/min. When forming the fiber web, for instance in a double wire former, stock is injected by the headbox in between two forming clothings, which both run over a wire support, such as a forming roll. The outer clothing is a wire, which is permeable to water. The other clothing (e.g. a felt or a wire) is intended to carry the web for further processing. The stock has a fiber concentration of between 0.1 to 0.5% and the flow is about 0.5 m$^3$/sec per meter of web width in the cross-machine direction. The forming of the web occurs by means of the water within the stock being drained through the outer flexible fabric, i.e. the wire, such that only a minor portion of the water is carried on by the fiber web. The water is squeezed out by the static pressure which is applied by means of the wire which is pretensioned by lead rolls against the forming roll. Due to the above mentioned force the water that leaves through the wire will theoretically normally have a larger speed than the peripheral speed of the forming roll. Since enormous amounts of water are drained, e.g. in a normal large tissue machine (6 meters wide) the flow of drainage water is about 3 m$^3$/sec, it is realized that large amounts of energy are released at this point of a paper machine. Hitherto, none of this energy has been recovered, at least not the kinetic part thereof, the water merely being collected in a white water tray for recirculation. The same problem is relevant also in connection with single wire formers using a single wire and a forming roll or in a blade former type of a forming section, wherein a forming roll is not required.

SUMMARY OF THE INVENTION

It is an object of the invention to minimize the above-mentioned disadvantages by providing a method and an apparatus for recovery of a substantial part of the kinetic energy of the drained white water in a paper machine. In accordance with the invention, a method for operating a forming section of a paper machine comprises the steps of discharging stock from a headbox into a forming zone of the forming section, the forming zone including at least one forming fabric arranged in a loop and traveling in the forming zone along a curvilinear path, water from the stock being drained through the at least one forming fabric in the forming zone such that the water exits with a substantial velocity from the at least one forming fabric; and capturing the water exiting from the at least one forming fabric and converting kinetic energy of the water into a useful form for supplying power to a further device in the papermaking machine.

Preferably, the kinetic energy of the water is converted into useful form by a movable component placed in the path of the water exiting from the forming zone such that the moving water causes the movable component to be moved. In preferred embodiments of the invention, the movable component is a turbine that is rotated by the moving water. The turbine preferably is a reaction turbine, more preferably a cross-flow type of reaction turbine such as a Banki turbine. A rotating shaft of the turbine can be used for supplying mechanical power to a further device such as a pump, or can be used for operating an electrical generator, which in turn can supply electrical power to a further device. It is particularly preferred to use the energy provided by the turbine to power a stock pump of the paper machine.

In preferred embodiments of the invention, the at least one forming fabric in the forming zone passes over a convex surface of a support member, and the turbine and the support member are disposed on opposite sides of the forming fabric. Preferably, at least one guide plate is disposed adjacent the forming fabric for guiding water expelled therefrom into the turbine. The convex surface preferably has a substantially constant radius of curvature in the forming zone and the at least one guide plate comprises a first guide plate a major portion of which is spaced radially outward from and generally parallel to the convex surface in the forming zone. The major portion of the first guide plate preferably also has a substantially constant radius of curvature, which advantageously is between about 100 percent and 120 percent of the radius of curvature of the convex surface of the support member. The support member can be of various types depending on the type of former used in the paper machine. For example, the support member can be a forming roll, a forming shoe, or a series of dewatering blades. Where a forming roll is employed, the first guide plate preferably has an angular extent of about 20° to 90° about a center of the forming roll. The optimal angular extent of the guide plate can depend on the type of forming roll used. Advantageously, when the forming roll has an impermeable surface the first guide plate has an angular extent of about 40° to 80°, whereas when the forming roll comprises a vacuum forming roll the first guide plate has an angular extent of about 20° to 50°.

By the invention surprisingly large amounts of energy may be recovered from the kinetic energy of the water which is taken out from the stock during the dewatering process in connection with the forming of the web. Calculations show that for a tissue twin wire machine having a 6-meter wide headbox and a machine speed of 1800 m/min up to 800 kW can be recovered, which implies a saving of about 2 million SEK/year. Since the investment cost is relatively moderate, the pay-off time can be made very short depending on the price of electricity.

BRIEF DESCRIPTION OF THE DRAWINGS

In the following the invention is described in more detail with reference to the accompanying drawings, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
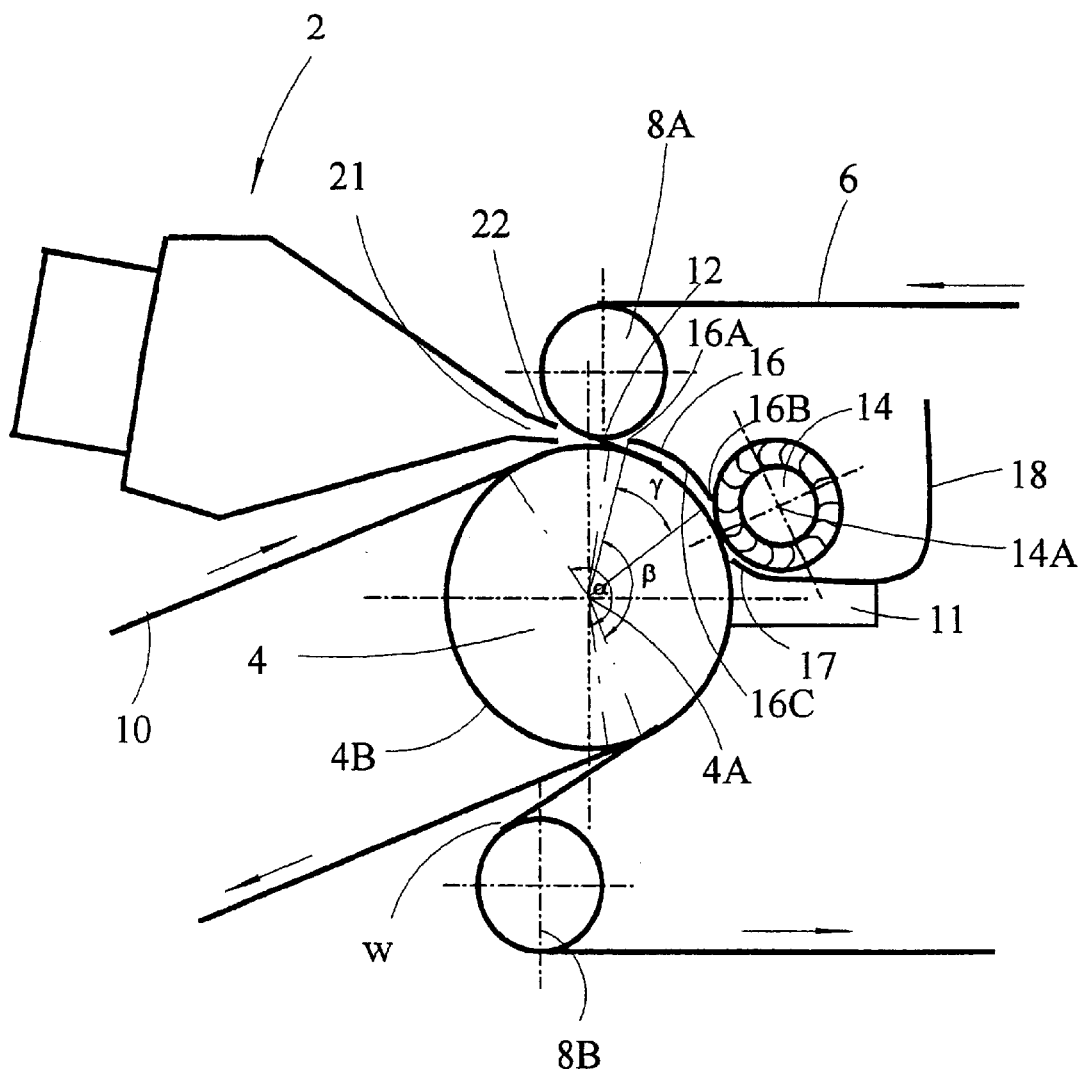
FIG. 1 shows a schematic side view of an arrangement according to the invention.

The invention may be used with all kinds of double-wire formers, i.e. wherein two clothings (two wires, or one wire and a felt, depending on the need of drainage capacity) run on top of each other around a support member, e.g. a forming roll. In FIG. 1 there is shown a so-called crescent former comprising a headbox 2, a forming roll 4, a wire 6 and a felt 10. The forming roll 4 has an outer surface 4B which is impermeable, i.e. a so-called solid surface. The forming roll 4 rotates about an axis 4A. The felt 10 runs around the forming roll, in contact with its outer surface 4B, with an angular extension of contact α which is slightly more than 180°. The wire 6 runs around the forming roll 4 on top of the felt 10 with an angular extension of contact β which is less than 180°. The wire 6 is pressed against the felt on top of the surface 4B of the forming roll 4 by means of an upper guiding roll 8A and a lower guiding roll 8B. The headbox 2 injects stock 21 through its discharge opening 22 into a nip 12, which is formed where the wire 6 meets the felt 10. According to the invention, a turbine 14 is positioned in close proximity to the periphery of the forming roll 4. A guide plate 16 having a radius R2 which is slightly larger than the radius R1 of the forming roll 4 (see FIG. 2) is positioned at a distance from the forming roll 4 between the nip 12 and the turbine 14. The angular extension γ of the guide plate 16 is about 35°, and its upstream edge 16A is positioned close to the nip 2, whereas its downstream end 16B is positioned close to the turbine 14. Downstream of the turbine 14 close to the periphery of the forming roll 4 there is positioned a second guide plate 17, behind and below the turbine 14. The axis 14A of the turbine is connected to an electric generator 11 (schematically shown), preferably by means of a transmission (not shown). The turbine 14 is of a reaction type, preferably a so-called Banki turbine, which is also called a cross-flow turbine due to its function. This kind of turbine is especially suitable in connection with an arrangement according to the invention, since it is very well suited for recovering energy from water moving with relatively high speed, as will be the case according to the invention. The guide plate 16 has a constant curvature R2, which is slightly larger than the radius R1 of the forming roll 4. Advantageously, the guide plate radius of curvature R2 is between about 100 percent and 120 percent of the forming roll radius R1, and more preferably is about 105 percent of the radius R1 of the forming roll 4. The guide plate 16 is positioned such that its concave surface 16C, which forms the path along which the water is guided, is positioned about 20 to 50 mm above the surface of the wire 6. There is a white water tray 18 for collecting the water shed from the forming zone.

The function of an arrangement according to the invention is as follows. Once the felt 10 and the wire 6 of the forming section are running at the desired speed, e.g. 1500 m/min, stock 21 is injected by means of discharge opening 22 of the headbox 2. The stock is supplied into the nip 12 and thereafter it follows between the two clothings 6, 10 and the forming roll 4. A major amount of the water contained in the stock 21 will be squeezed out through the wire 6 by wire tension. As a result, the water that is squeezed out will have a slightly higher speed than the peripheral speed of the forming roll 4. Tests show that if the peripheral speed is 30 m/sec, the speed of the water droplets will be about 30.4 m/sec. For a roll with an impermeable surface as used in FIG. 1, the dewatering will occur along about 60° of an angular zone starting at the nip 12. The dewatering flow is largest during the first 10° then slightly decreases. The droplets will be collected on a curved surface 16C of the guide plate 16, which is formed to create as little turbulence as possible, which is achieved by having the surface 16C with as little irregularities as possible and by using a constant curvature. The water will collect along the guide plate 16 and finally be guided into the turbine 14 with an optimal direction of flow to recover as much of the kinetic energy as possible. For a cross-flow turbine (e.g. Banki turbine) 14, about 80% of the energy is recovered during the flow into the turbine and about 20% during the flow out of the turbine. This cross-flow function is the reason why a Banki turbine is particularly suitable. Downstream of the turbine 14 there is a second guide plate 17, which has a reversed curvature in relation to the first guide plate 16 to guide a further amount of water into the turbine 14. The rotation of the turbine 14, which is caused by the water, will be transferred by its axis 14A to a transmission (not shown) coupled to an electric generator for producing electric energy. A transmission is favorable in most applications to transform the rotational speed of the turbine 14 to a rotational speed which is optimal for the generator 11. It is evident that different kinds of generators may be used, e.g. alternator or continuous current generator, depending on the circumstances.

In the preferred embodiment the electrical power which is produced by the generator 11 is supplied to the stock pumps (not shown), which feed the headbox 2.

In accordance with the invention, large amounts of energy may be recovered. With an optimized arrangement the total yield may be about 60%. If the stock flow is about 0.5 m³/sec per cross sectional meter, the power that can be recovered for a six meter wide machine is about 810 kW. At a price of 0.30 SEK/kW, this will lead to annual saving of about 2 MSEK with 350 days of operation per year. Considering further aspects of the invention, e.g. environmentally friendly, it is realized that the achievements of the invention are surprisingly positive.

Figure 2:
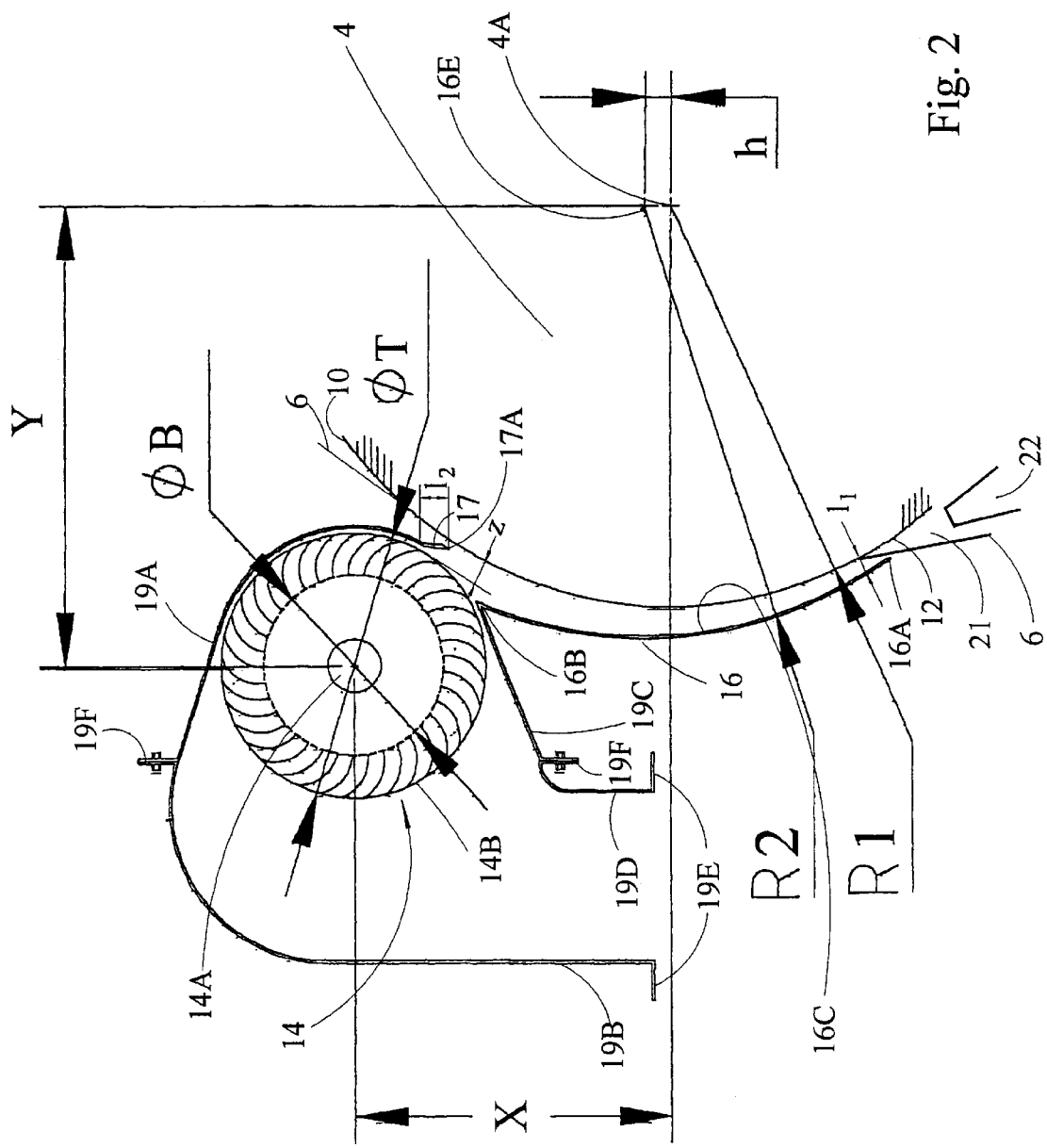
FIG. 2 shows a side view of essential parts of a preferred embodiment according to the invention.

FIG. 2 shows a more detailed view of an embodiment according to the invention. The basic principles thereof are exactly the same as in relation to FIG. 1, except the positioning of the arrangement and the use of a second wire instead of the felt 10. In FIG. 2 the headbox 2 is positioned below the center 4A of the forming roll 4 and the injection discharge opening 22 is directed upwardly. The radius R1 of the forming roll is 760 mm. The radius R2 of the guide plate 16 is constant and about 810 mm. The center of the constant curvature of the guide plate 16 is offset in relation to the center 4A of the forming roll, i.e. 50 mm above the center 4A of the forming roll 4. The shortest distance $l_1$ between the guide plate and the periphery of the forming roll (wire 6) is about 35 mm. Due to the offset location of the center 16E of curvature of the guide plate 16 the distance increases constantly in the upward direction. The distance between the turbine 14 and the periphery 4B of the forming roll 4 is about 50 mm. (Normally the distance should be between 10 and 100 mm, preferably between 20 and 70 mm.)

The second guide plate 17, which is substantially flat, is positioned with its edge 17A close to the periphery 4B of the forming roll 4, e.g. about 10 mm between the edge 17A and the wire 6. The cross sectional length 12 of the second guide plate 17 is about 50 mm. The width of the guide plates in the cross-machine direction would normally be the same, i.e., the same as the turbine. Accordingly the first guide plate 16 directs the major part of the moving water into the turbine 14 with a first direction adapted to the angle of the turbine blades at the position of the downstream end 16B of the guide plate at that position. The direction of the extension of the second guide plate 17 is adapted to the optimal angle of the turbine blades at that position. Around the turbine 14 there is a housing 19. The housing comprises several parts, namely, an innermost upper part 19A, an outermost lower part 19B, a lowermost inner part 19C, and a lowermost base part 19D. The different parts are attached to each other by means of flanges 19F. At the bottom of the housing 19, there are flanges 19E for attachment of the housing to the white water tray 18 of the paper machine. The uppermost part of the housing 19A (positioned downstream of the guide plate 16) is fitted to enclose, at a short distance, a large part of the periphery 14B of the turbine in order to guide the water in a correct manner, to be further explained in relation to FIG. 3. The outer diameter $\varnothing T$ of the turbine is 500 mm. The inner diameter of the turbine $\varnothing B$ is 340 mm.

Figure 3:
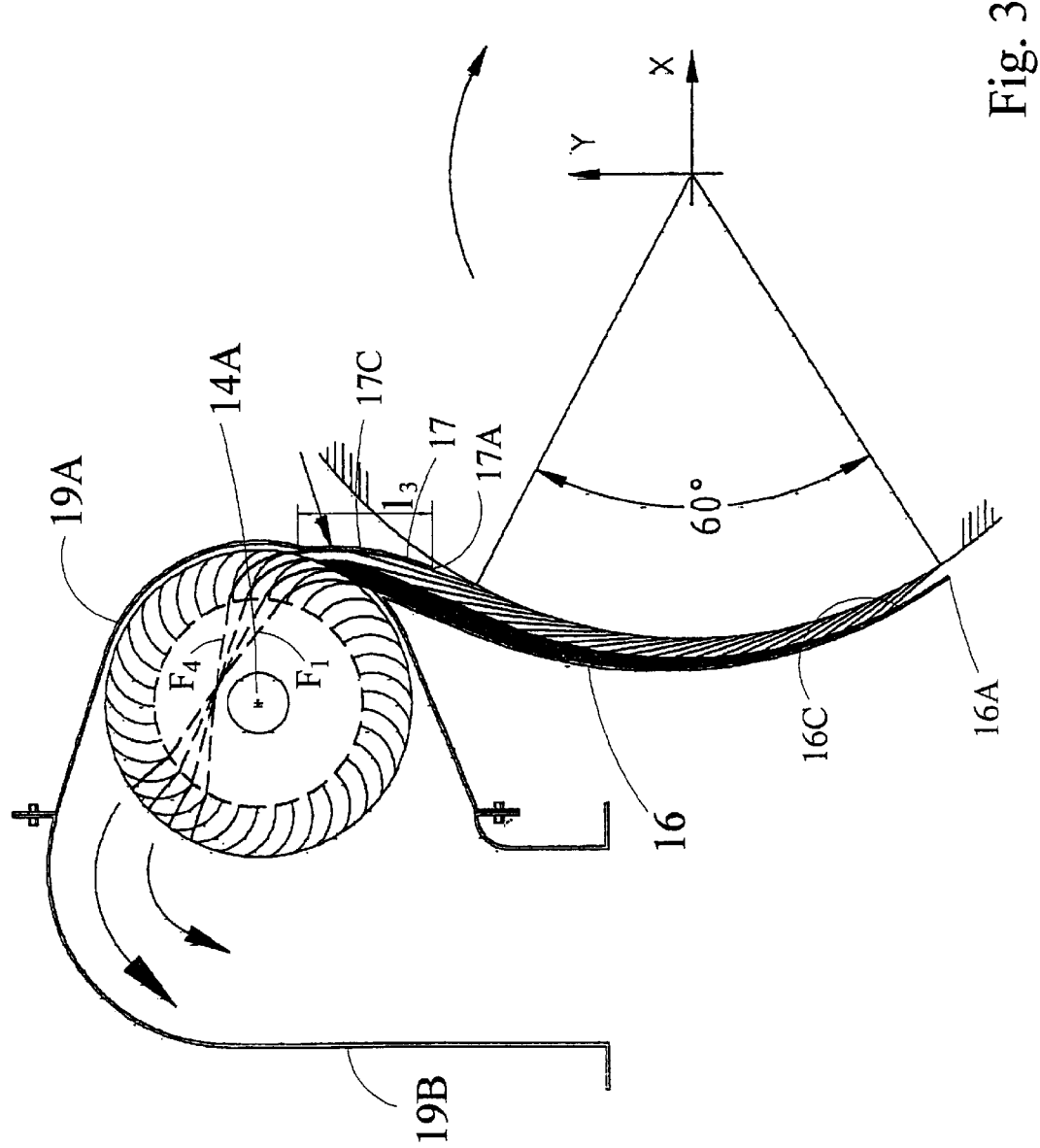
FIG. 3 shows a modification of the embodiment shown in FIG. 2.

FIG. 3 shows an embodiment which is similar to FIG. 2, with the exception that the turbine 14 is positioned further away from the forming roll 4. As a consequence, the last part of the inner surface 16C of the guide plate is made flat. It is important that the transition from the constant curvature to this straight part is smooth without formation of any turbulence-creating features. Also, the second guide plate 17 is different from that of FIG. 2. In order to guide the water, it is made substantially longer, such that its length $l_3$ is about ¼ of the radius R1 of the forming roll, i.e. about 200 mm. The second guide plate is curved in an opposite manner in comparison with the first guide plate 16.

The lines $F_1$ to $F_4$ show different flow patterns of the water passing through the turbine. The major part of the water will pass through the turbine 14 along the flow line $F_1$. Accordingly, the water is first redirected and imparts energy to the turbine wheel 14 at the entrance, which gives the flow line $F_1$ through the inner part of the turbine and finally the moving water hits the turbine crosswise, i.e. from the inside moving out and imparts further kinetic energy thereto. The water entering into the turbine by means of the second guide plate 17 will move through the turbine along a flow pattern according to $F_4$. This cross-flow pattern of the Banki turbine is especially suitable for use in connection with the invention.

Figure 4:
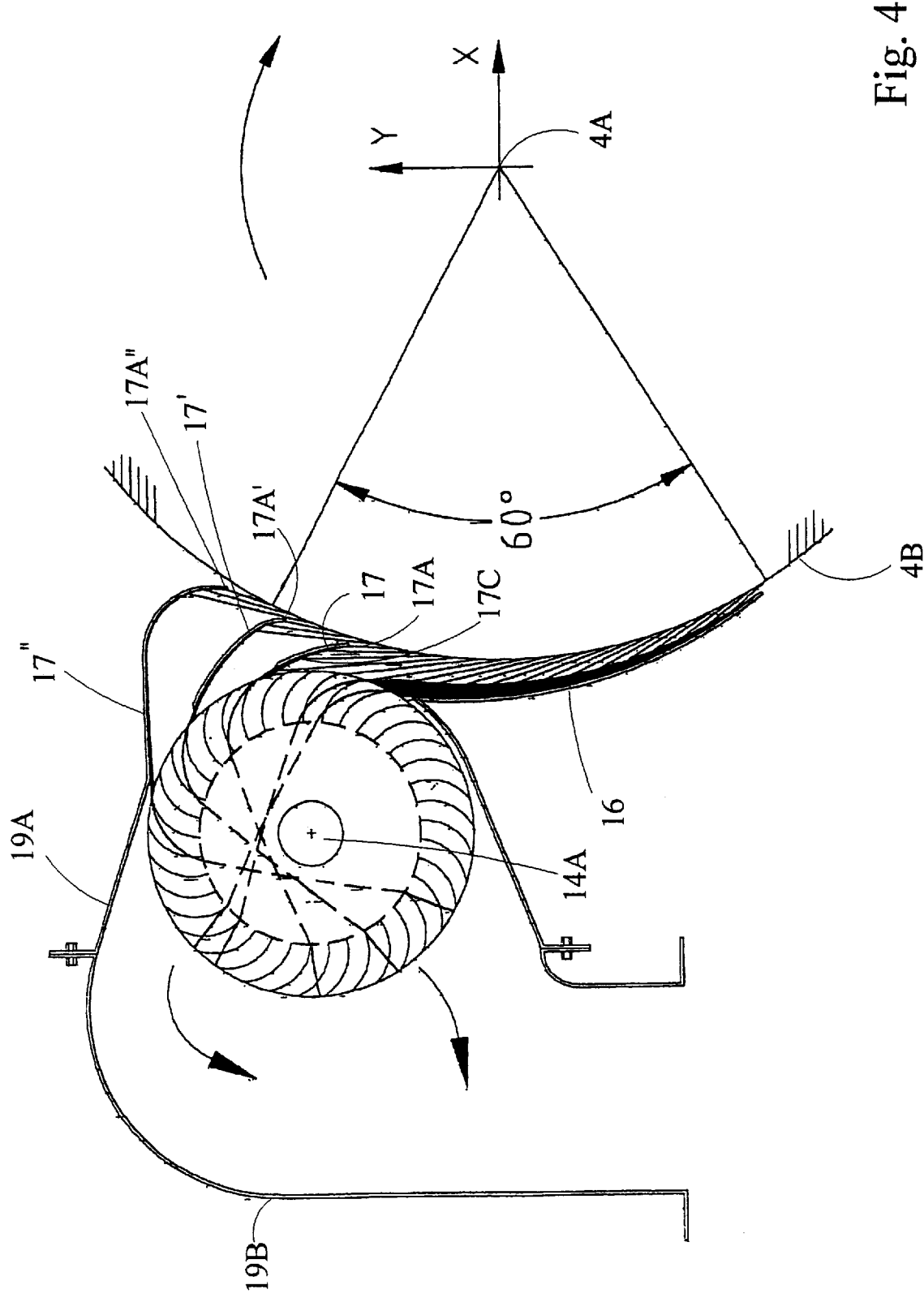
FIG. 4 shows a second modification of the embodiment shown in FIG. 2.

In FIG. 4 there is shown a number of guide plates 17, 17', 17" downstream of the first guide plate 16 for the turbine 14. The different guide plates are positioned such that the innermost edges 17A, 17A', 17A" are about equally spaced apart. Each successive guide plate captures water that managed to bypass earlier guide plates. In other aspects, this embodiment is similar to what is described in relation to FIG. 2.

Figure 5:
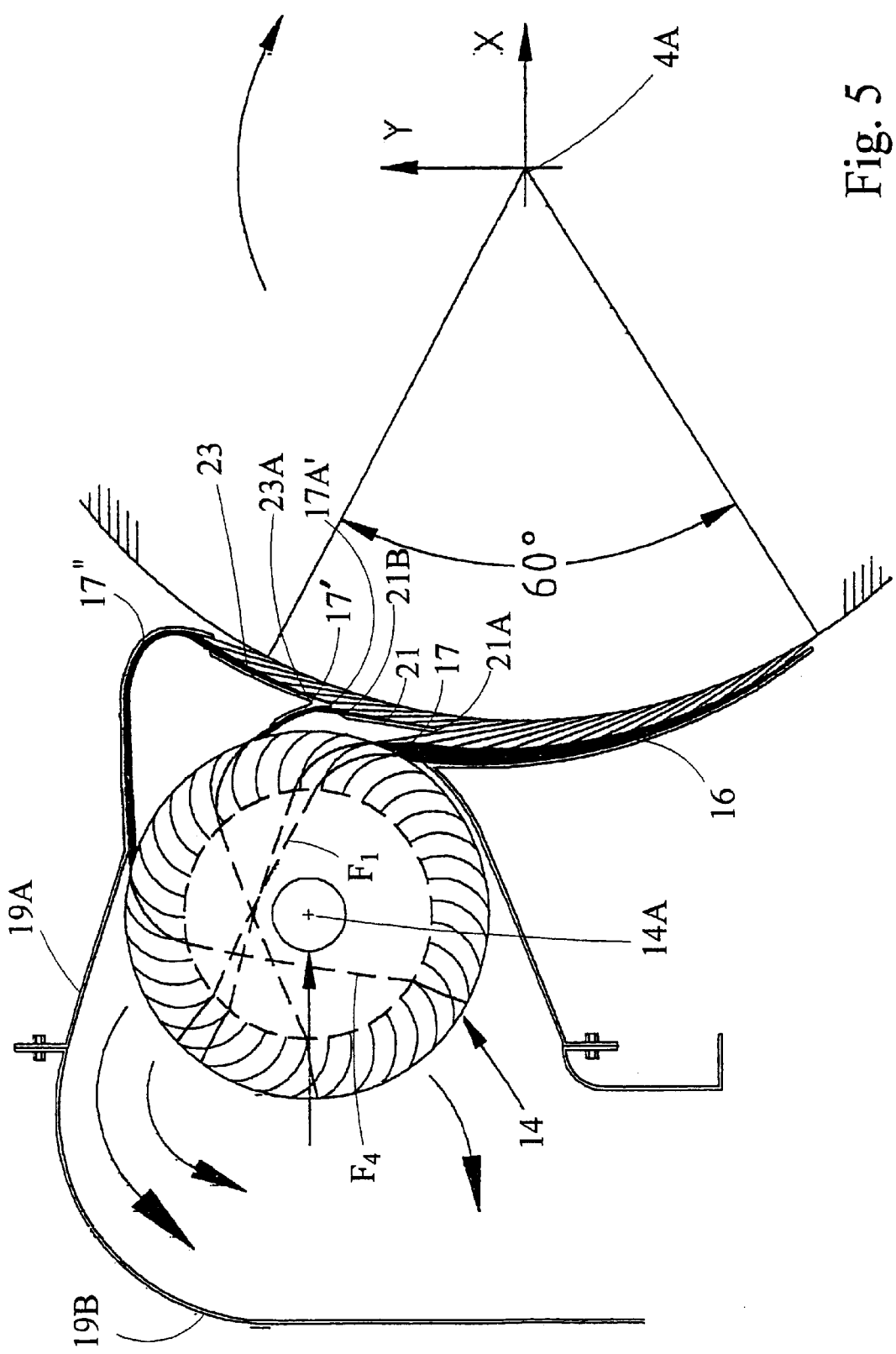
FIG. 5 shows a third modification of the embodiment shown in FIG. 2.

In FIG. 5 there is shown a further embodiment using several devices for guiding the water downstream of the turbine. Instead of using a single plate-shaped element as a guide plate, V-shaped elements 17, 21; 17', 23 are used to direct the water for the first two guiding devices. A first device 17, 21 comprises a guide plate 17 which is substantially positioned as shown in FIG. 4. Joined with its front edge 17A there is a further guide plate 21 which is positioned substantially tangentially in relation to the periphery of the forming roll 4. Behind its rear end 21B there is formed an opening between it and the downstream end 17'A of the second guide plate 17'. In a similar manner there is a second tangentially positioned guide plate 23, which has its front end 23A joined with the front end 17A' of the second guide plate 17', such that a second opening is formed to allow the water to be directed along a third downstream guide plate 17". Also here the different flow patterns ($F_1$ to $F_4$) of the water coming from the different guide plates can be seen.

Figure 6:
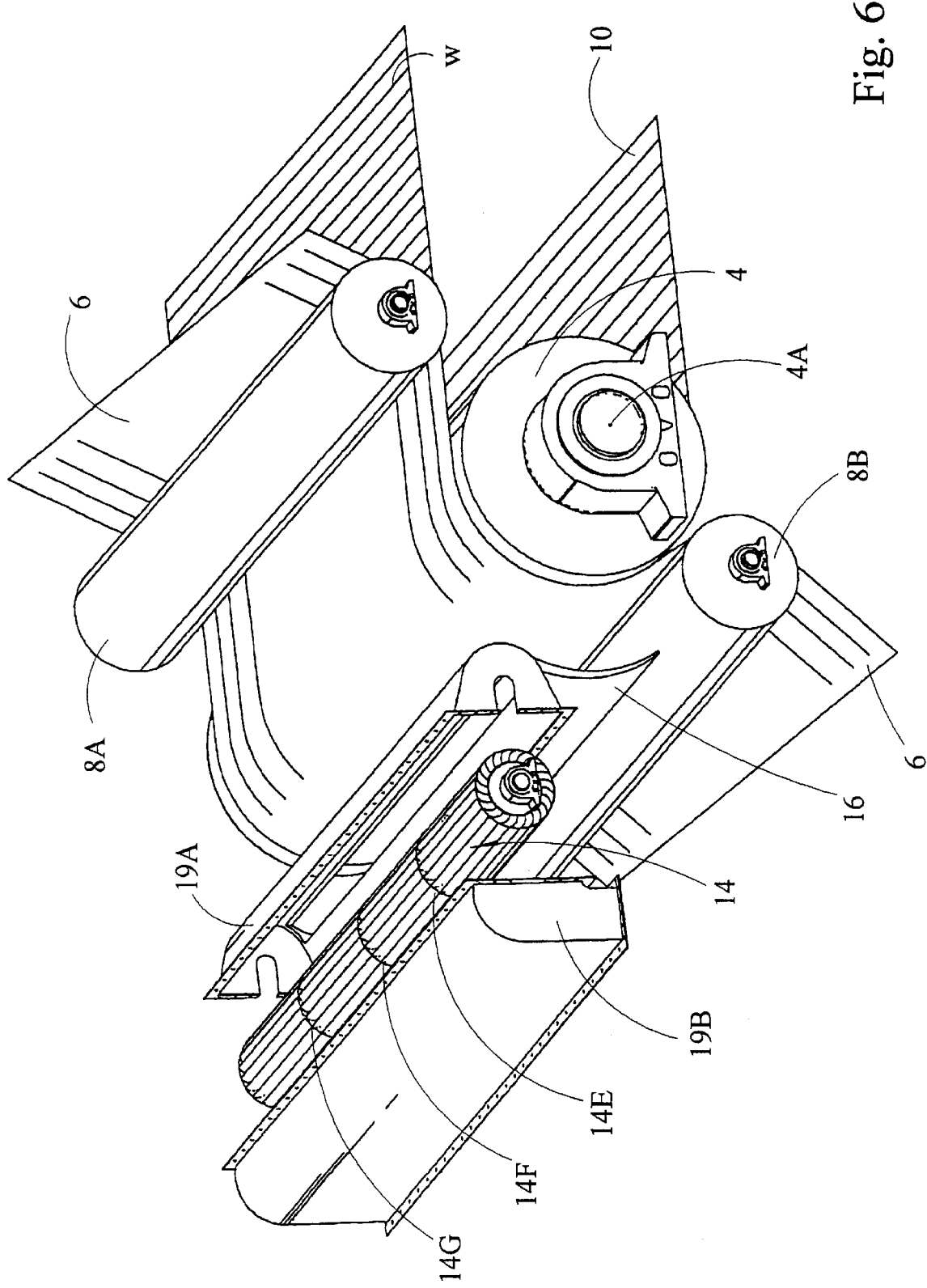
FIG. 6 shows a perspective view of essential parts of an embodiment of the invention.

In FIG. 6 there is shown a perspective view of some essential parts of the arrangement according to the invention, except for the headbox and the electric generator, which are not shown. As can be seen, the cross-machine widths of the various parts 4, 6, 8, 10, 14, 16 are substantially the same. It should be noted that the turbine, the cover parts 19A, 19B and the guide plate 16 are not shown in their working positions. As can be seen, the turbine 14 is divided into sections by means of annular support plates 14E, 14F, 14G, such that each section is about 1 m to 1.8 m wide.

In the following the invention will be shown arranged in different positions in relation to some known kinds of formers.

Figure 7:
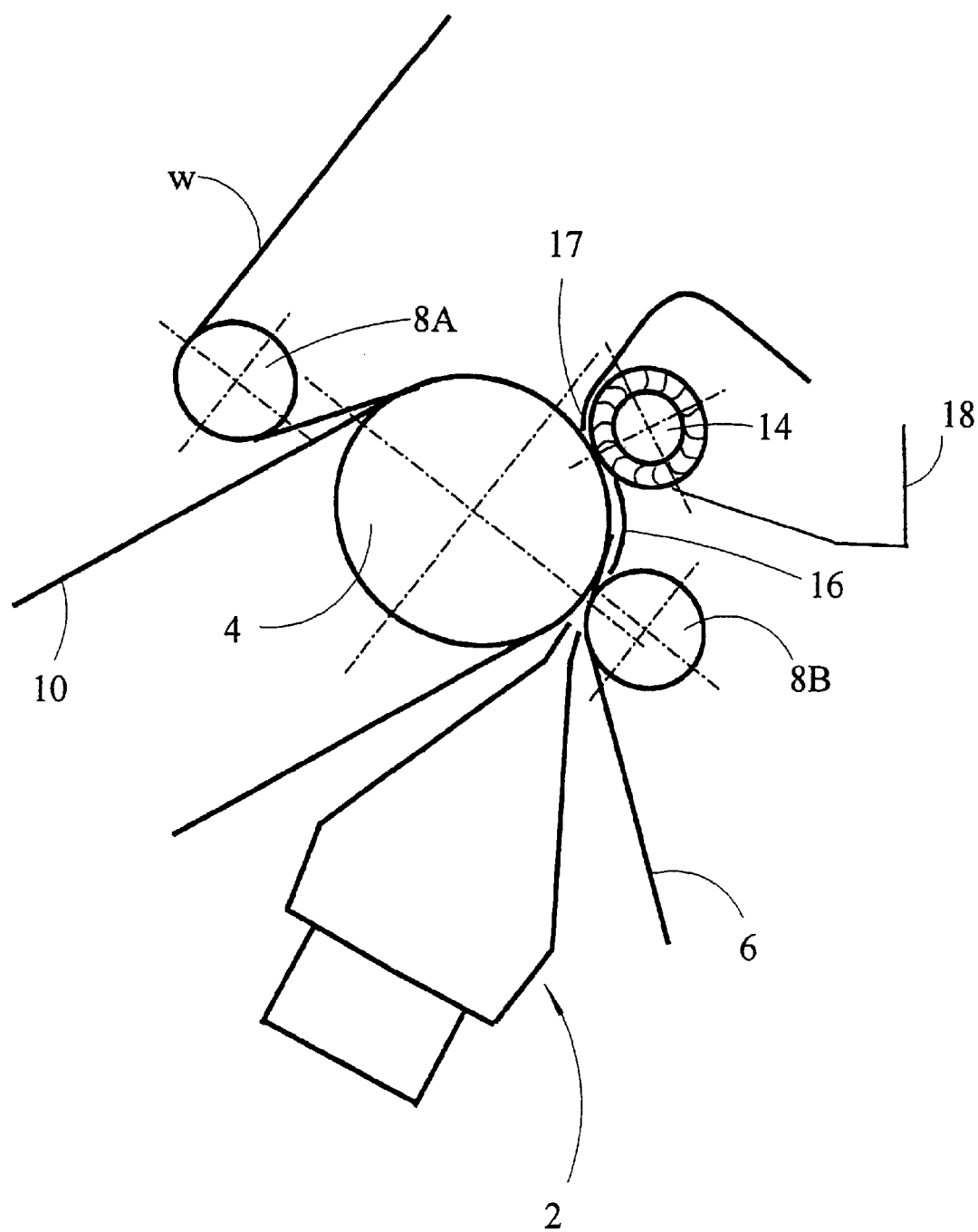
FIG. 7 shows an embodiment of the invention in connection with a so-called "C-former"

In FIG. 7 there is shown a C-former (as well as in FIG. 1), wherein the headbox 2 is positioned underneath the forming roll 4. Consequently, the web W is formed during an upward motion around the forming roll 4. The other parts 6, 10, 8, 14, 16, 17 of the invention are arranged accordingly, i.e. the guide plate 16 is positioned below the turbine 14 (but upstream thereof as in FIG. 1). Also in FIG. 7 (as well as in FIG. 1) the forming roll 4 has an impermeable surface.

Figure 8:
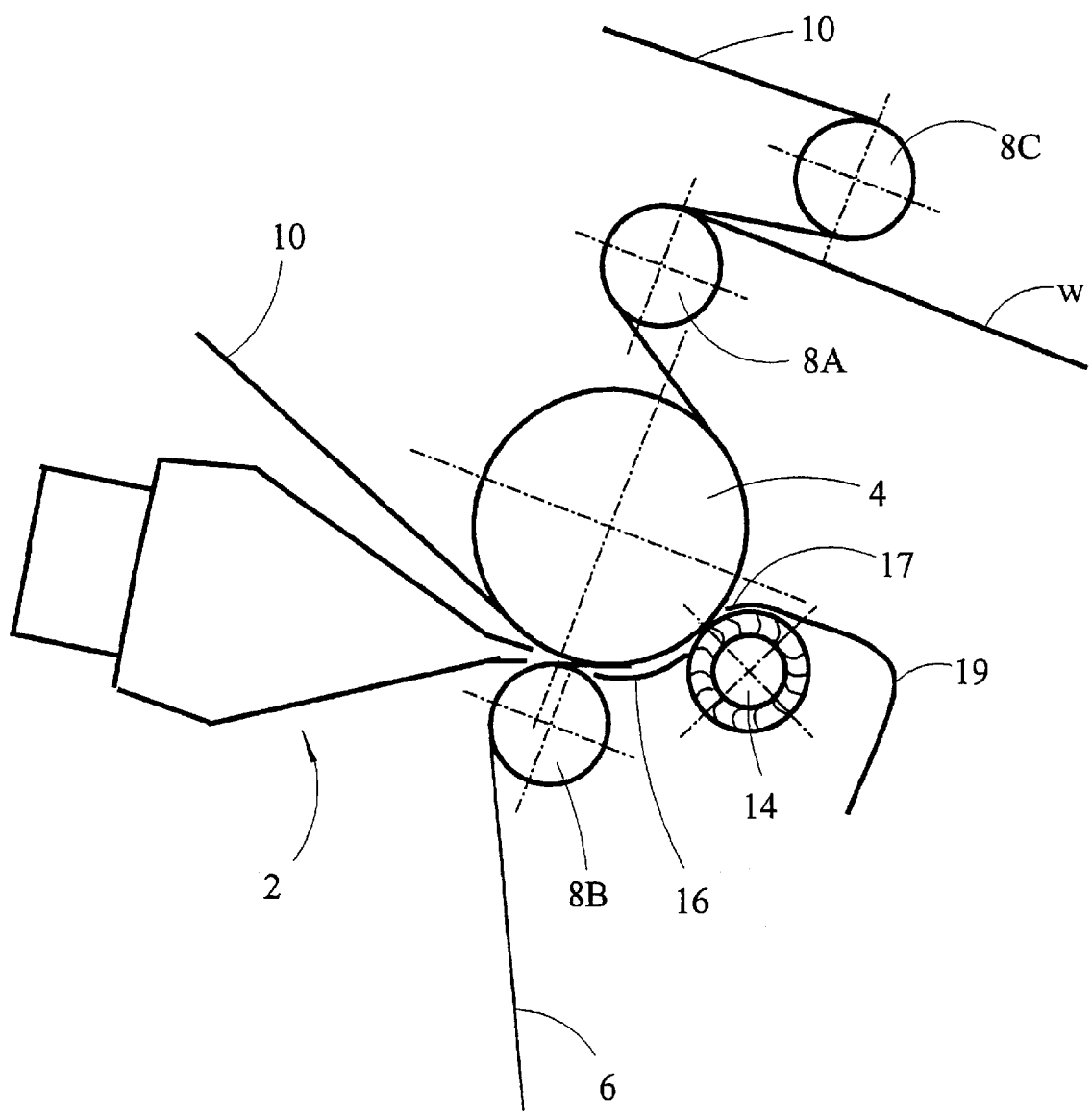
FIG. 8 shows the principle of the invention in connection with a so-called "S-former"

In FIG. 8 there is also shown an impermeable forming roll 4 but of the so called S-former type. According to an S-former the wire 10 moves around one of the lead rolls 8A and then again around a third lead roll 8C. The wire 6 is guided substantially along the same principles as within the C-former, i.e. around two lead rolls 8A, 8B which urges it against the forming roll 4. The arrangement of the other parts 14, 16, 17 of this embodiment of the invention is in principle the same as described above.

Figure 9:
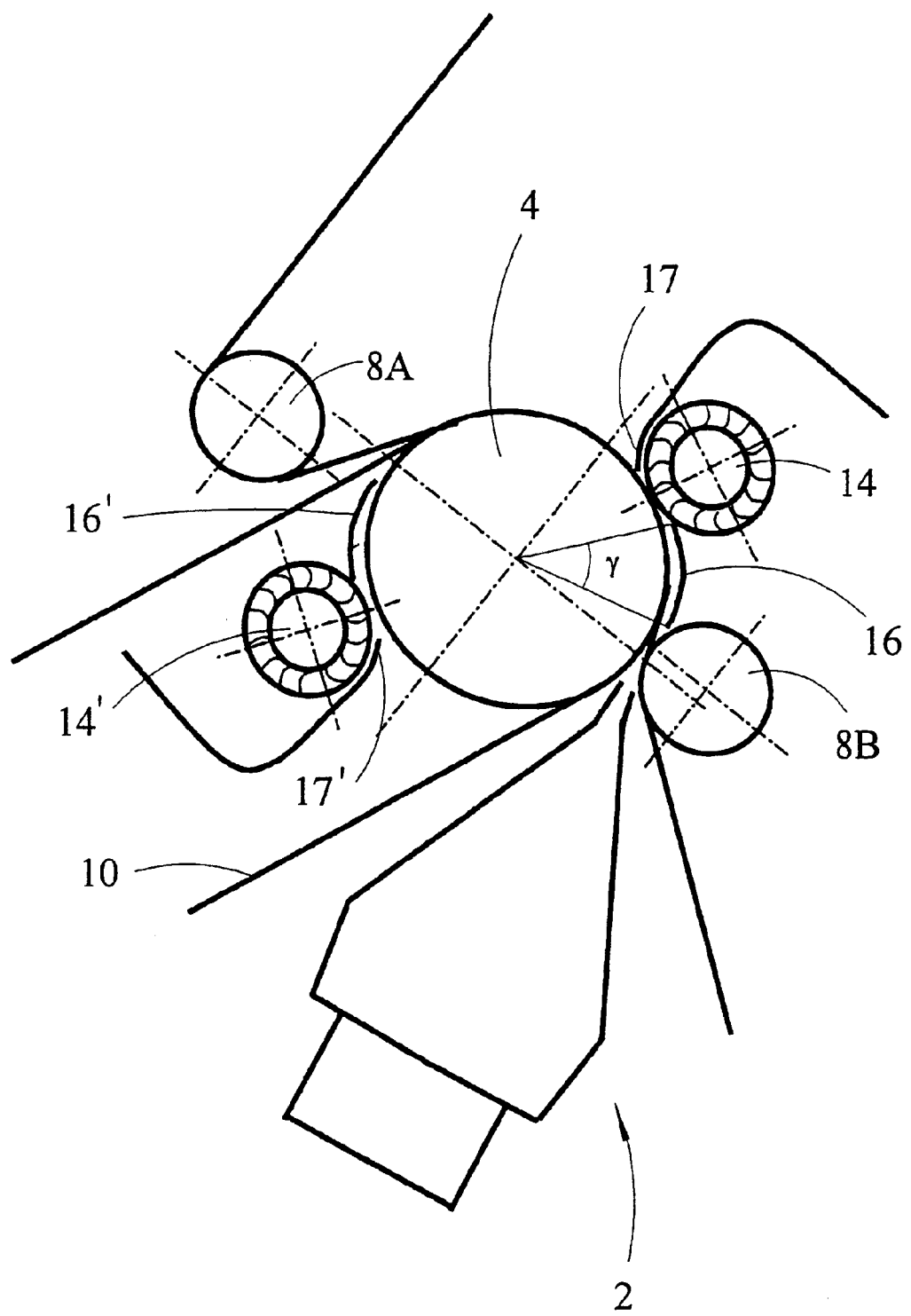
FIG. 9 shows the principles of the invention in connection with a C-former having a vacuum roll.

In FIG. 9 there is shown a C-former with a vacuum roll as the forming roll 4. Accordingly, the guide plate 16 may preferably have about half the angular extension γ as if the forming roll 4 has an impermeable surface, e.g. about 25 to 40°. Furthermore, it is shown that a second turbine 14' is arranged on the opposite side of the forming roll from the first turbine 14. It has been shown that in connection with the vacuum roll 4 about 60% of the water is drained within the first part, i.e. at the area where the guide plate 16 is positioned. The remaining amount, i.e. 40%, is drained after the vacuum section of the roll. The vacuum section of the roll 4 begins shortly in front of the nip 12 and extends somewhat downstream (the same direction as the rotation of the forming roll) of the position where the wire 10 gets out of contact with the surface of the forming roll 4. Accordingly, the water which has been sucked into the wire and the forming roll 4 will leave it at this position and the kinetic energy thereof is recovered in the second turbine 14' in the same way as in connection with the first turbine 14. Thus, there is a first guide plate 16' and a second guide plate 17' for guiding the remaining amount of the water into this second turbine 14'.

Figure 10:
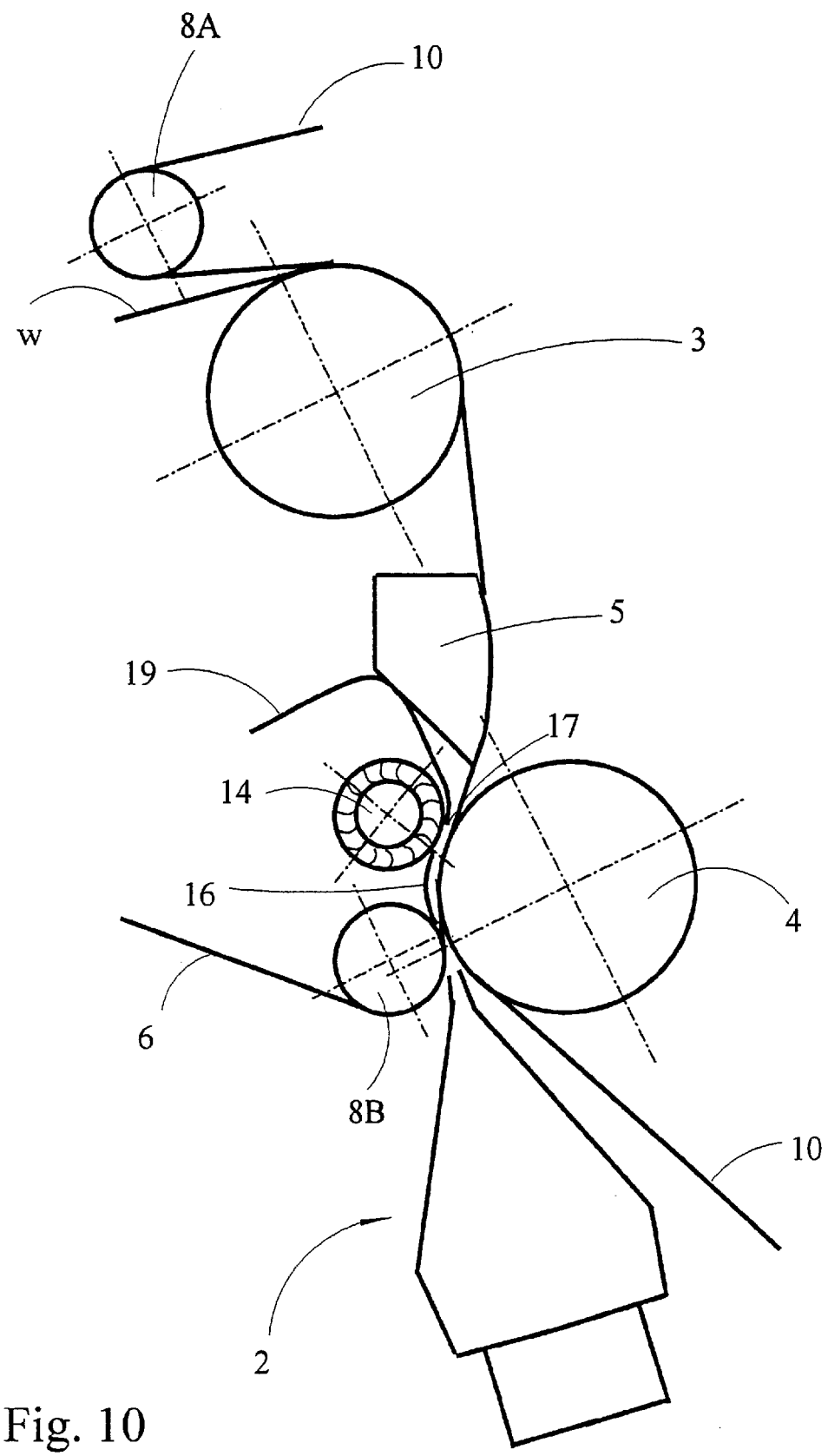
FIG. 10 shows the principles of the invention in connection with a so called speed former.

In FIG. 10 there is shown a speed former with an arrangement according to the invention. In the speed former the wires 6 and 10 jointly move with the web W therebetween, firstly over the forming roll 4, thereafter over a blade former 5, and thereafter over a vacuum roll 3, after which the wire 6 and the web W are separated from the wire 10, which is moved around a second lead roll 8A. The principles for the use of the energy recovering parts 14, 16, 17, 19 according to this embodiment are generally the same as described above. Alternatively the forming roll 4 may be substituted by a blade former (not shown).

Figure 11:
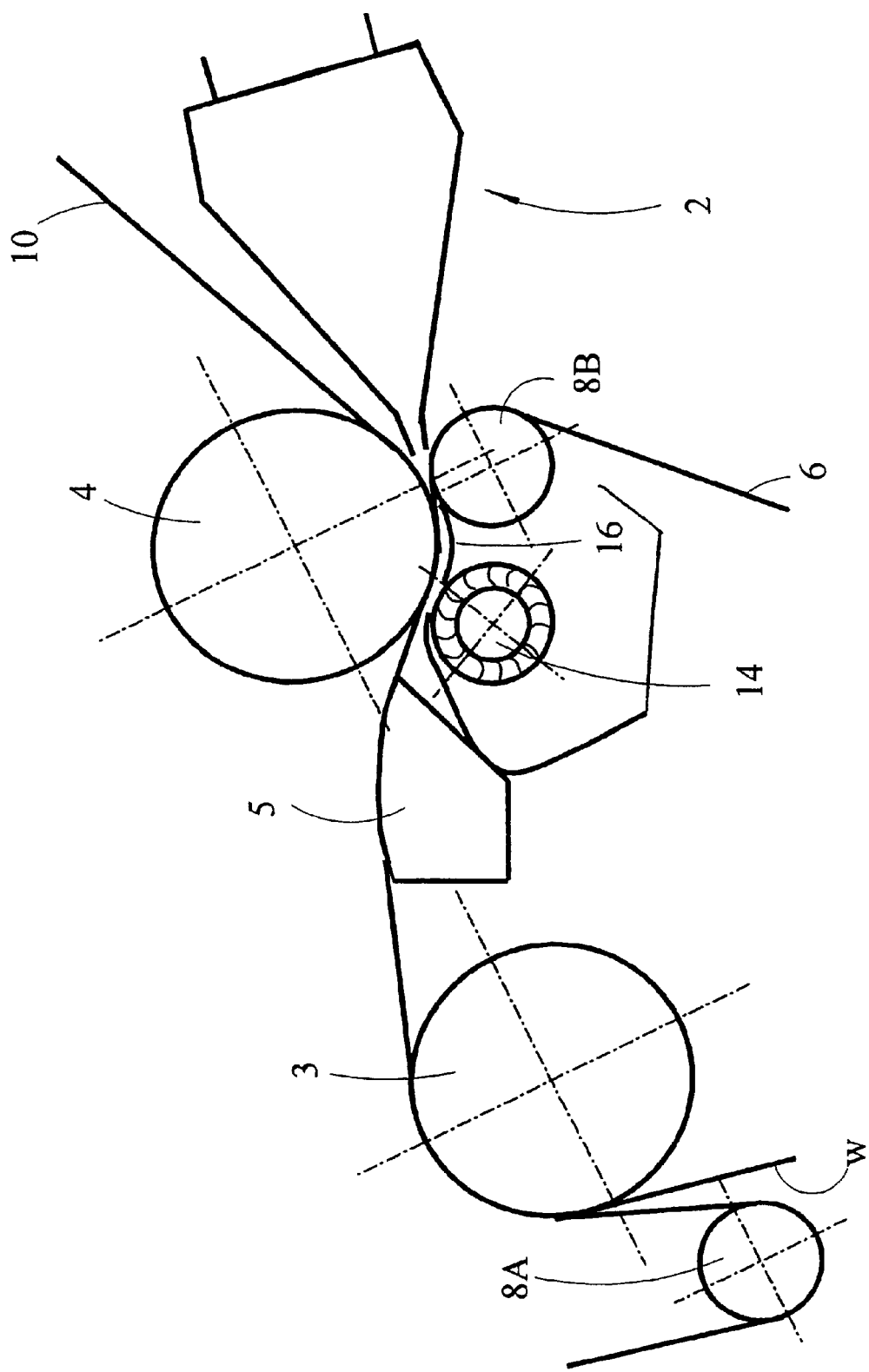
FIG. 11 shows the principles of the invention in connection with a speed former in a horizontal position.

In FIG. 11 substantially the same arrangement as in FIG. 10 is shown, except that the speed former has been displaced about 90°.

Figure 12:
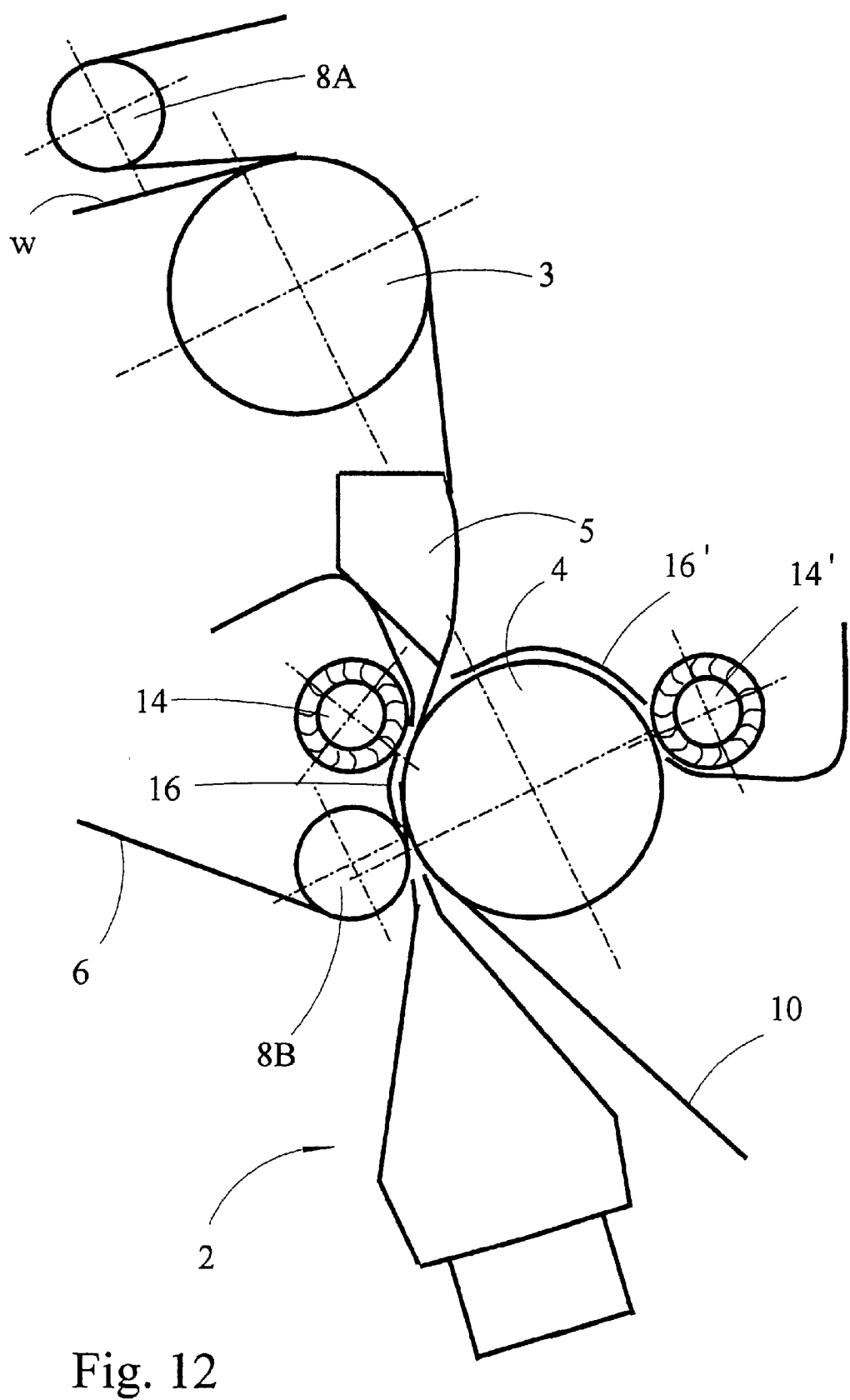
FIG. 12 shows in principle the same as FIG. 10, but with a vacuum roll as the forming roll.

In FIG. 12 there is shown a speed former positioned in the same way as shown in FIG. 10. Contrary to what is shown in FIG. 10, there is used a vacuum roll as the forming roll 4. Two energy recovering units 14, 16; 14', 16' are used to recover energy from the drained water, substantially in the same way as described in relation to FIG. 9.

Figure 13:
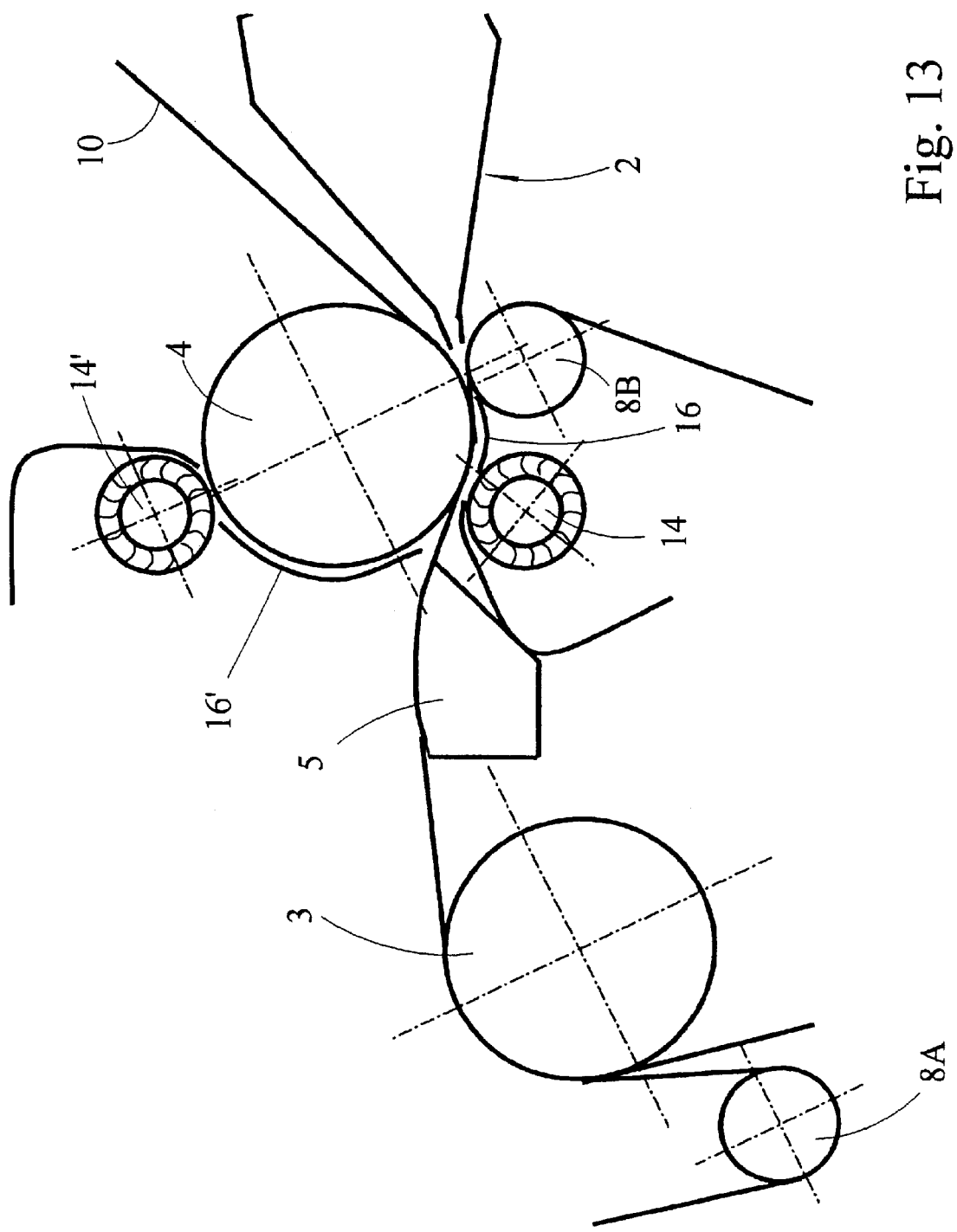
FIG. 13 shows in principle the same as FIG. 11, but with a vacuum roll as the forming roll.

FIG. 13 is the same as FIG. 12 but with the speed former displaced 90°.

Figure 14:
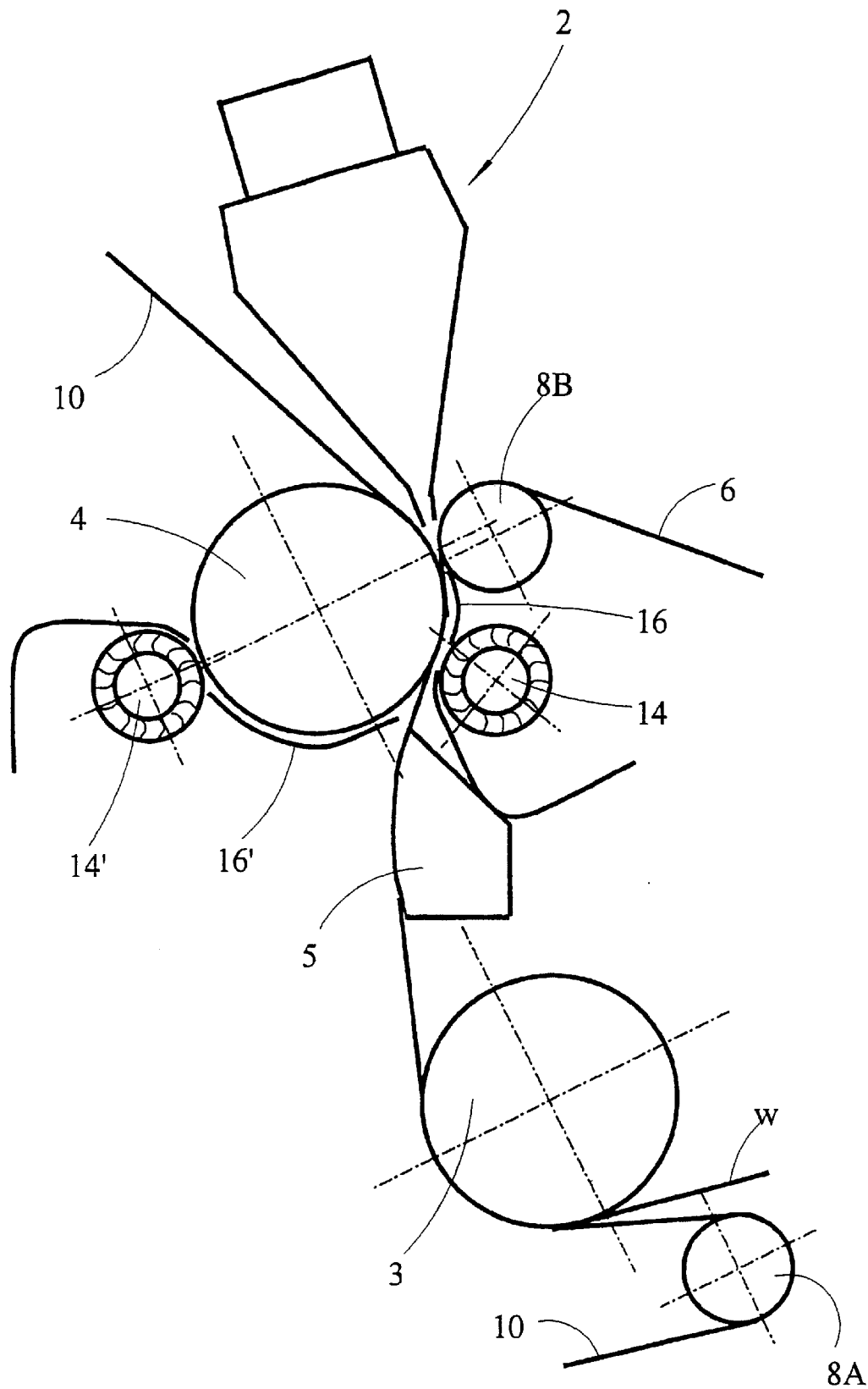
FIG. 14 shows an alternate embodiment of the invention with a speed former.

FIG. 14 also shows in principle the same as FIG. 12 but with the speed former displaced 180°.

The invention is not limited to the embodiments shown above but they may be varied within the scope of the appending claims. For instance, it is evident for the person skilled in the art that other kinds of recovering means than a Banki turbine may be used, e.g. other kind of turbines or even a device working along the principles of an endless chain conveyor. Furthermore, it is evident that the recovered energy may be used to directly drive another unit/machine, e.g. to drive a pump via an appropriate transmission. For the person skilled in the art it is also obvious that the invention may be used in connection with a forming roll and a single wire former, forming with different types of wire support. However, in this case the water will not be squeezed out through the forming clothing but drained therethrough by gravitation or by means of a vacuum box, as is known per se. In order to recover the kinetic energy the sides of the vacuum box will have to be adopted to the direction of movement of the water leaving the forming clothing, such that it is guided in an optimal manner to a turbine or some other means which is positioned to receive the guided water in an optimal manner, essentially in the same manner as described above in relation to the guiding plate. Moreover the principles of the invention may also be used in connection with a dewatering section where the water flow is directed to the sides of the paper machine, where turbines are positioned to recover the energy in accordance with the principles of the invention as described above. This latter embodiment would normally not be preferred since the moving water would have to be guided a long distance from the forming roll to the position where its kinetic energy is recovered. Tests have shown that the kinetic energy decreases exponentially in relation to a distance that the water has to flow along the guiding plate, before entry into the turbine. Accordingly, it is preferred to have the turbine positioned adjacent the forming roll as described in connection with the embodiments shown in the figures. Moreover, it is obvious for the skilled man that a felt 10 may in many installations be exchanged by a wire and vice versa. Finally, it is evident for the skilled man that the invention may be used in connection with double-wire formers which do not use any roll in the forming zone, e.g. in connection with a former described in U.S. Pat. Nos. 4,308,097; 4,416,730; and 5,853,544.

What is claimed is:

1. A method for operating a forming section of a papermaking machine, the method comprising:
    discharging stock from a headbox into a forming zone of the forming section, the forming zone including at least one forming fabric arranged in a loop and traveling in the forming zone along a path, water from the stock being drained through the at least one forming fabric in the forming zone such that the water exits from the at least one forming fabric; and
    capturing the water exiting from the at least one forming fabric and converting kinetic energy of the water into a useful form for supplying power to a further device in the papermaking machine.

2. The method of claim 1, wherein the water is captured by a movable component that is moved by the captured water, the movable component converting kinetic energy of the water into useful form.

3. The method of claim 2, wherein the water is captured by a turbine that is rotated by the water, the turbine converting kinetic energy of the water into useful form.

4. The method of claim 3, wherein the at least one forming fabric in the forming zone passes over a convex surface of a support member, and the turbine and the support member are disposed on opposite sides of the at least one forming fabric.

5. The method of claim 4, wherein at least one guide plate is disposed adjacent the at least one forming fabric for guiding water expelled therefrom into the turbine.

6. The method of claim 5, wherein the convex surface has a substantially constant radius of curvature in the forming zone and the at least one guide plate comprises a first guide plate a major portion of which is spaced radially outward from and generally parallel to the convex surface in the forming zone.

7. The method of claim 6, wherein the major portion of the first guide plate has a substantially constant radius of curvature.

8. The method of claim 7, wherein the radius of curvature of the major portion of the first guide plate is between about 100 percent and 120 percent of the radius of curvature of the convex surface of the support member.

9. The method of claim 7, wherein the support member comprises a forming roll and the first guide plate has an angular extent of about 20° to 90° about a center of the forming roll.

10. The method of claim 9, wherein the forming roll has an impermeable surface and the first guide plate has an angular extent of about 40° to 80°.

11. The method of claim 9, wherein the forming roll comprises a vacuum forming roll having a surface that includes perforations and the first guide plate has an angular extent of about 20° to 50°.

12. The method of claim 1, wherein the at least one fabric is moved through the forming zone at a speed exceeding about 1000 m/min.

13. The method of claim 1, wherein an electric generator is used for converting the kinetic energy of the water into electrical energy.

14. The method of claim 1, wherein the water is guided into a cross-flow turbine by a first guide plate having a leading edge proximate a location where the stock is discharged from the headbox and a trailing edge proximate the turbine.

15. The method of claim 14, wherein the water is further guided into the turbine by a second guide plate having a leading edge downstream of the trailing edge of the first guide plate.

16. The method of claim 1, wherein the at least one forming fabric comprises a pair of forming fabrics that converge to form a nip into which the stock is discharged by the headbox, the forming fabrics then running together through the forming zone and the water being expelled through an outer one of the forming fabrics.

17. An apparatus for forming a paper web in a papermaking machine, comprising:

a support member having a convex surface;

at least one forming fabric arranged in an endless loop and traveling over the convex surface so as to form a forming zone;

a headbox for discharging stock into the forming zone such that the stock is deposited onto the at least one forming fabric and water from the stock is drained through the at least one forming fabric so as to exit with a substantial velocity from a convex side of the at least one forming fabric in the forming zone; and a movable component located proximate the forming zone for capturing the water exiting from the at least one forming fabric, the movable component being moved by the exiting water and converting kinetic energy of the water into a useful form for usage by a further device in the papermaking machine.

18. The apparatus of claim 17, wherein the movable component comprises a turbine that is rotated by the exiting water.

19. The apparatus of claim 18, wherein the turbine comprises a reaction turbine.

20. The apparatus of claim 19, wherein the turbine comprises a cross-flow turbine.

21. The apparatus of claim 17, wherein the at least one forming fabric comprises an inner forming fabric that runs over the convex surface in contact therewith and an outer forming fabric that runs on top of the inner forming fabric in the forming zone, the outer forming fabric being arranged in an endless loop and the movable component being disposed inside the loop of the outer forming fabric.

22. The apparatus of claim 17, wherein the support member comprises a forming roll.

23. The apparatus of claim 17, further comprising at least one guide plate for guiding water to the movable component.

24. The apparatus of claim 23, wherein the convex surface has a substantially constant radius of curvature along a direction in which the forming fabric travels in the forming zone and wherein the at least one guide plate comprises a first guide plate a major portion of which is spaced radially outward from and generally parallel to the convex surface in the forming zone.

25. The apparatus of claim 24, wherein the major portion of the first guide plate has a substantially constant radius of curvature along the direction in which the forming fabric travels in the forming zone.

26. The apparatus of claim 25, wherein the radius of curvature of the major portion of the first guide plate is between about 100 percent and 120 percent of the radius of curvature of the convex surface of the support member.

27. The apparatus of claim 25, wherein the first guide plate has a leading edge and a trailing edge with respect to the direction in which the forming fabric travels in the forming zone, and the first guide plate has an angular extent between the leading and trailing edges of about 20° to 90° about a center of the radius of curvature of the convex surface.

28. The apparatus of claim 27, wherein the convex surface comprises an impermeable surface of a forming roll and the first guide plate has an angular extent of about 40° to 80° about a center of the forming roll.

29. The apparatus of claim 27, wherein the convex surface comprises a permeable surface of a vacuum forming roll and the first guide plate has an angular extent of about 40° to 80° about a center of the forming roll.

30. The apparatus of claim 25, wherein the at least one guide plate further comprises a second guide plate located downstream of the first guide plate.

31. The apparatus of claim 30, wherein the second guide plate has a curvature in an opposite sense to that of the first guide plate.

32. The apparatus of claim 31, wherein the second guide plate comprises a wedge-shaped structure that becomes thicker in a direction in which the water flows over the wedge-shaped structure.

33. The apparatus of claim 25, wherein the support member comprises a forming roll and the movable component comprises a turbine rotatable about an axis parallel to an axis of the forming roll.

34. The apparatus of claim 33, the turbine having an outer diameter that is between about 50% and 90% of an outer radius of the forming roll.

35. The apparatus of claim 33, wherein the turbine has an outer periphery spaced from the convex surface of the forming roll by a distance of about 5 mm to 700 mm.

36. The apparatus of claim 33, wherein the turbine comprises a Banki turbine.

* * * * *